Feb. 20, 1934.  T. J. SWAN  1,947,682

ROOF BOW TRIM RAIL

Filed Sept. 28, 1931

INVENTOR

Travers J. Swan,

BY

ATTORNEYS

Patented Feb. 20, 1934

1,947,682

UNITED STATES PATENT OFFICE 1,947,682

ROOF BOW TRIM RAIL

Travers J. Swan, Detroit, Mich., assignor to Reynolds Spring Company, Jackson, Mich., a corporation of Michigan Application September 28, 1931
Serial No. 565,569

2 Claims. (Cl. 296—118)

My invention relates to automobile roof structures and more particularly to an improved roof bow trim rail.

In the manufacture of automobile roofs it is desirable to have a structure of maximum strength and at the same time reduce the weight thereof to a minimum. One of the chief weight factors of the present day automobile roof is the solid wooden bow upon which the roof slats are supported. Moreover the wooden type of bow soon warps and thus materially affects the appearance of the automobile roof.

With this in mind it is an object of the present invention to provide a roof bow trim rail which is strong and durable extremely light in weight, and will maintain its shape.

Another object of the invention is to provide a roof bow trim rail for automobiles which will effectively support both the roof covering and the head lining.

Further, the invention provides a light weight metallic roof bow trim rail equipped with a fibrous strip which provides an anchoring or supporting means for the headlining.

It is another object of the invention to provide a roof bow trim rail which is fashioned from a single length of light weight sheet metal and is provided with means for the retention of a fibrous insert to which the head lining is anchored.

The invention consists in the novel combination of elements, construction and arrangement of parts to be hereinafter specifically referred to, claimed and illustrated in the accompanying drawing, wherein—

Referring to the invention in detail, a length of sheet metal of uniform length and width is designated at 5. The length of sheet metal is bent longitudinally intermediate its ends as indicated at 6 to produce an upstanding web portion 7 and a substantially horizontal flange 8.

Figure 1:
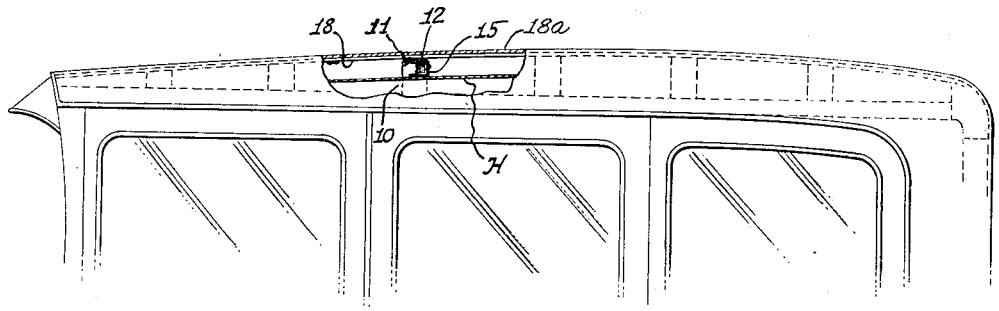
Figure 1 is a fragmentary side elevation of an automobile having parts of the roof broken away.
Figure 2:
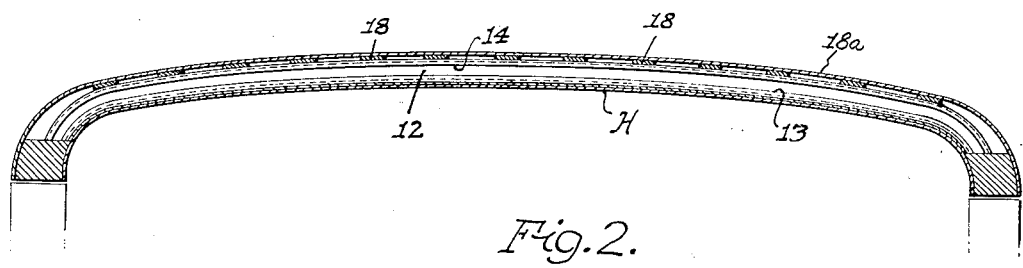
Fig. 2 is a vertical transverse section of the same.
Figure 3:
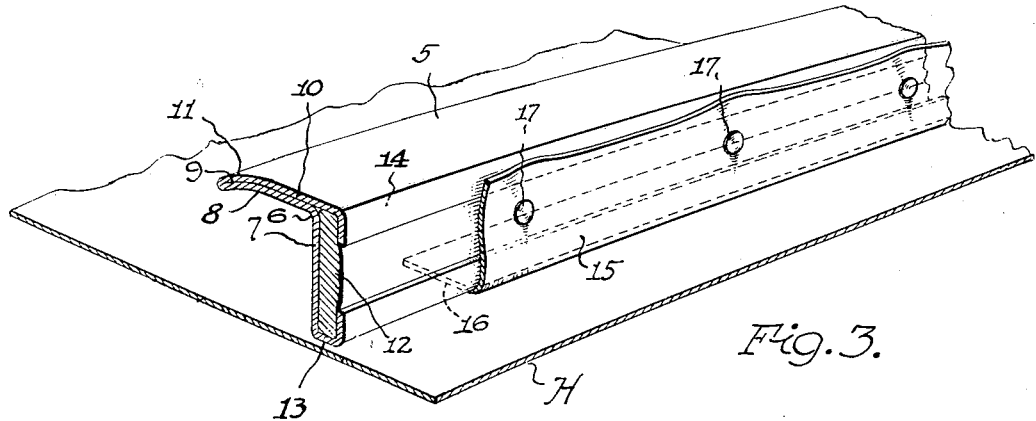
Fig. 3 is an enlarged perspective having parts shown in section.

At the outer edge of the flange 8 the sheet metal length is bent upon itself as at 9 and extended reversely to provide a second flange 10 which, as shown in Figure 2, abuts the flange 8 throughout its entire length. Thus, the flanges 8 and 10 provide a bearing member for the usual slats 18 and roof covering 18a.

As shown in Figure 2, this bearing member is downwardly curved at its outer longitudinal edge as indicated at 11 so as to avoid any sharp edges which may cut or otherwise injure the roof covering.

Means are provided for securing a fibrous insert or strip 12 to the roof bow trim rail so that the head lining H may be anchored thereto. For this purpose the lower edge of the web or flange 7 is bent upon itself to provide a channel or U-shaped member 13. The flange 10 is extended rearwardly beyond the flange 8 and terminates in a depending flange 14 which is located in vertical alinement with the outermost vertical leg of the channel shaped member 13 and with the upper portion of the web 7, provides a U-shaped or channel shaped member. The insert 12 abuts the web 7 and has its opposite longitudinal edges clinched by the flange 14 and the outermost vertical leg of the channel shaped member 13. It will be manifest that the fibrous insert will be effectively held to the roof bow trim rail so that the head lining will be effectively anchored to the former.

The usual head lining securing strip 15 is extended beneath the roof bow trim rail bearing member and is cemented to the upper face of the head lining "H" as indicated at 16. The strip 15 is positioned against the outer face of the fibrous insert and is tacked or otherwise fastened thereto by fastenings 17.

What I claim is:—

1. In an automobile roof bow, a length of sheet metal bent at right angles to provide an upstanding web and a substantially horizontally extending flange providing a bearing surface for the roof, the length of metal being bent longitudinally at the outer edge of the flange and extended reversely to a point beyond the web and terminating in a depending flange an upwardly extending flange formed at the lower edge of said web, and a fibrous anchoring strip placed against said web and held by said depending and upwardly extending flanges.

2. As an article of manufacture, a metal automobile bow trim rail comprising a fibrous strip having one of the axes of its cross section longer than the other, a sheet metal member covering both edges and one face of said strip and extended from one edge of the strip to form a flange perpendicular to the longer axis, said metal member being flanged over the other face of the strip and leaving a portion of said face exposed for tacking purposes.

TRAVERS J. SWAN